G. A. MADISON.
CAP FOR HOSE COUPLINGS.
APPLICATION FILED JUNE 18, 1908.
923,545.
Patented June 1, 1909.
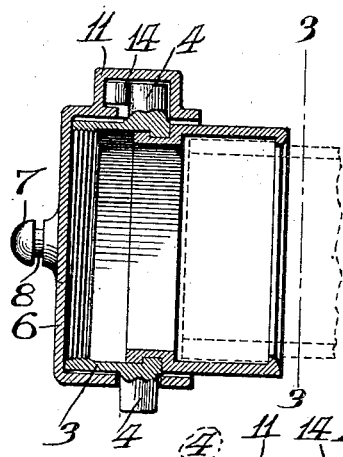
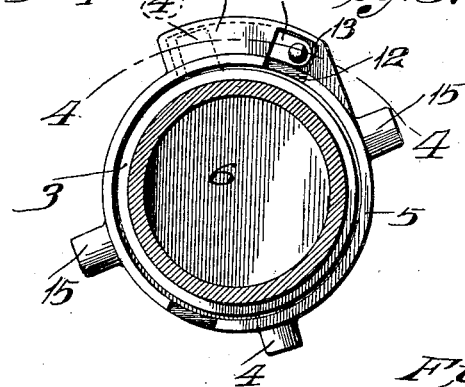
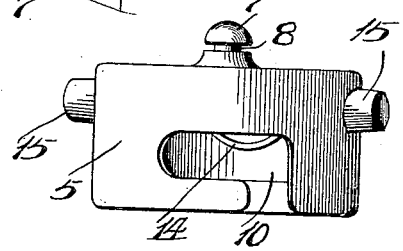
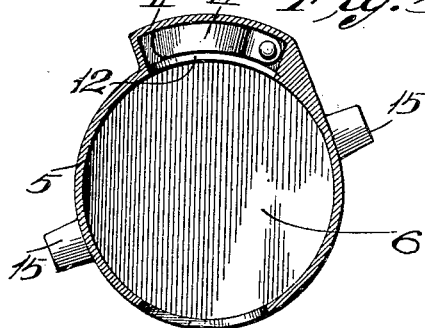
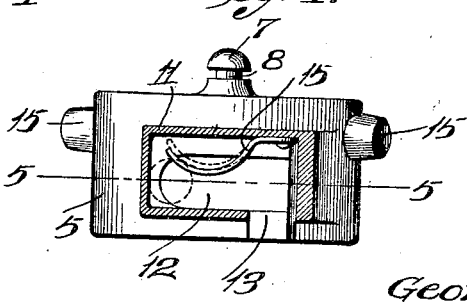
Inventor
George A. Madison

UNITED STATES PATENT OFFICE.

GEORGE A. MADISON, OF ST. LOUIS, MISSOURI.

CAP FOR HOSE-COUPLINGS.

No. 923,545.  Specification of Letters Patent.  Patented June 1, 1909.

Application filed June 18, 1908. Serial No. 439,220.

*To all whom it may concern:*

Be it known that I, GEORGE A. MADISON, a citizen of the United States, and resident of St. Louis, Missouri, have invented certain new and useful Improvements in Caps for Hose-Couplings, of which the following is a specification containing a full, clear, and exact description, reference being had to the accompanying drawings, forming a part hereof.

My invention relates to a cap for hose couplings, the object of my invention being to provide a cap which is detachably applied to the hose coupling on the end of an exposed water pipe connection, said cap being for the purpose of protecting the hose coupling and preventing objects, such as sticks or stones, from being forced into the ends of the pipe, which objects clog the pipe and render the same inoperative when a hose connection is made.

To the above purposes, my invention consists in certain novel features of construction and arrangement of parts, which will be hereinafter more fully set forth, pointed out in the claims, and illustrated in the accompanying drawings, in which:

Figure 1 is a perspective view of an exposed twin hose coupling, showing my improved caps applied thereto; Fig. 2 is an enlarged vertical section taken on the line 2—2 of Fig. 1; Fig. 3 is a cross section taken on the line 3—3 of Fig. 1; Fig. 4 is a section taken on the line 4—4 of Fig. 3; Fig. 5 is a vertical section taken on the line 5—5 of Fig. 4; and Fig. 6 is an elevation of the cap showing a bayonet joint slot therein.

Referring by numerals to the accompanying drawings: 1 designates a water pipe provided with the twin branches 2, and arranged for rotation on the end of each branch is a collar 3, the outer portion of which is interiorly screw threaded, and said collar being provided with a pair of oppositely arranged outwardly projecting lugs 4.

5 designates the body of my improved cap, which is in the form of a cylinder, with its outer end closed by the integral plate 6, and formed integral with the central portion of this plate 6 is a lug 7, provided with a groove 8, and attached to said grooved lug is one end of a chain 9 or the like, the opposite end of which is attached in any suitable manner to a portion of the pipe 1 or the branches 2.

Formed in one side of the body of the cap 5 is a slot 10, such as is ordinarily made use of in a bayonet joint connection, and formed integral with the opposite side of the body 5 of the cap is a housing 11, there being a longitudinally disposed slot 12 formed in the wall of the body 5 within this housing, and there being an opening 13 formed through one end of said housing 11 and connecting with the end of said slot 12.

Fixed to the side wall of the housing 11 opposite the wall in which the opening 13 is formed, is a spring 14, the main body portion of which is bowed or bent forward in such a manner as to occupy the central portion of the space within the housing 11. Formed integral with the said wall of the body 5 is an oppositely arranged pair of lugs 15, upon which a spanner wrench or like tool is located when the cap is removed from the end of the hose coupling.

The cap constructed as herein described is applied to the collar 3 by passing said cap over said collar with one lug 4 passing through the opening 13, and the opposite lug 4 passing through the mouth of the slot 10. A spanner wrench or like tool is now engaged on the lug 4, projecting through the slot 10, and the cap 5 is now rotated by means of the spanner wrench or the like, in such a manner as to bring one lug 4 into the end of the slot 10 while the opposite lug 4 passes the bowed portion of the spring 14 and assumes a position in the end of the housing 11 opposite the opening 13. When so positioned, the free end of the spring 14 bears against the lug 4 within the housing 11, and thus the cap 5 is held in position on the collar 3, protecting the same and preventing foreign objects from being inserted in the water pipe.

To remove the cap from the collar 3, a spanner wrench or the like is engaged on the exposed lug 4, and upon one of the lugs 15 on the cap, and said cap and collar are rotated in opposite directions to bring one of the lugs 4 into the end of slot 10, directly opposite the mouth thereof, and the opposite lug 4 into the end of the housing 11 directly opposite the opening 13, and said cap can now be readily withdrawn from the collar 3.

A cap of my improved construction is very easily applied to or removed from exposed hose couplings, and when positioned for use very effectually protects all parts of the rotating collar to which the ring on the hose is connected, and prevents the insertion of foreign matter into the water pipe.

I claim:

1. A cap for closing one end of a hose coupling, comprising a cylindrical body, one end of which is closed, and there being a pair of oppositely disposed slots formed in the wall of the body, a housing integral with the body of the cap over one of the slots therein, a spring fixed within the housing, and means formed integral with said cap for receiving a tool used in seating and unseating said cap.

2. The combination with the end of a hose coupling and the rotating collar carried thereby, of a cap for temporarily closing the end of the hose coupling, which cap comprises a cylindrical body, one end of which is closed, there being a pair of oppositely disposed slots formed in the wall of the body, a housing integral with the body of the cap over one of the slots therein, a spring fixed within the housing, the free end of which bears against the inserted portion of the hose coupling, and means integral with the cap for receiving a tool used in seating and unseating said cap.

In testimony whereof, I have signed my name to this specification, in presence of two subscribing witnesses.

GEORGE A. MADISON.

Witnesses:
M. P. SMITH,
E. L. WALLACE.